United States Patent [19]

Ito

[11] Patent Number: 5,405,627
[45] Date of Patent: Apr. 11, 1995

[54] PIZZA CRUST AND PROCESS FOR PRODUCTION THEREOF

[75] Inventor: Tadayoshi Ito, Yokohama, Japan

[73] Assignee: ITO Co., Ltd., Kanagawa, Japan

[21] Appl. No.: 890,115

[22] Filed: May 29, 1992

[30] Foreign Application Priority Data

May 30, 1991 [JP] Japan .................. 3-228181

[51] Int. Cl.⁶ .......................................... A21D 13/00
[52] U.S. Cl. ...................... 426/94; 426/283;
426/391; 426/549; 249/149; 249/187.1;
425/412
[58] Field of Search ............. 426/94, 391, 549, 283;
425/412; 249/149, 187.1

[56] References Cited

U.S. PATENT DOCUMENTS

| | | | |
|---|---|---|---|
| 2,111,021 | 3/1938 | Bemis | 426/391 |
| 2,774,316 | 12/1956 | Daino | 426/391 |
| 3,155,055 | 11/1964 | Nishkian | 107/15 |
| 3,407,079 | 10/1968 | Griffith et al. | 426/391 |
| 3,615,679 | 10/1971 | Tangel | 426/94 |
| 3,879,564 | 4/1975 | Cocozzella | 426/283 |
| 4,251,549 | 2/1981 | Fournet et al. | 426/391 |
| 4,271,200 | 6/1981 | Hempenius et al. | 426/391 |
| 4,283,424 | 8/1981 | Bone et al. | 426/391 |
| 4,283,431 | 8/1981 | Giordano et al. | 426/296 |
| 4,364,963 | 12/1982 | Munter et al. | 426/391 |
| 4,464,405 | 8/1984 | De Christopher | 426/391 |
| 4,911,634 | 3/1990 | Keener | 425/412 |

FOREIGN PATENT DOCUMENTS 0104743  4/1984  European Pat. Off. .

OTHER PUBLICATIONS

Patent Abstracts of Japan, vol. 14, No. 423 (C-757) (4366) 12 Sep. 1990.
Patent Abstracts of Japan, vol. 16, No. 168 (C-932) (5211) 22 Apr. 1992.
Patent Abstracts of Japan, vol. 16, No. 49, (C-908) (5092) 7 Feb. 1992.

*Primary Examiner*—Jeanette Hunter
*Assistant Examiner*—Mary Mims
*Attorney, Agent, or Firm*—Foley & Lardner

[57] ABSTRACT

A process for producing a pizza crust, comprising the steps of: fitting uncooked dough into a base template, placing a first cover template thereover, pressing down the first cover template and removing the first cover template, to thereby form a base layer; and supplying uncooked dough over the formed base layer, placing a second cover template thereover, pressing down the second cover template and removing the second cover template, to thereby prepare a top layer; and a pizza crust produced thereby. Additionally, an apparatus is described for producing a pizza crust comprising: a base template defining a shape of a lower surface of a base layer of the pizza crust; a first cover template defining a shape of an upper surface of the base layer of the pizza crust; and a second cover template defining a shape of an upper surface of a top layer of the pizza crust, wherein at least one of the first cover template and second cover template is provided with a plurality of needle-like projections for making holes in said layer.

7 Claims, 5 Drawing Sheets

PIZZA CRUST AND PROCESS FOR PRODUCTION THEREOF

BACKGROUND OF THE INVENTION

1. Field of the Invention

The present invention relates to a crust used as a base of a pizza pie, a device for production of the crust, and a method of producing same, and in particular, to a method of producing a crust able to be distributed in a dried state, which is not deformed, has a smooth feeling when eaten, and has a good flavor and taste.

2. Description of the Related Art

Pizza pie is a food developed in Italy, and in general, is a kind of pie prepared by adding yeast to wheat flour, kneading and maturing the mixture, spreading the mixture under pressure on a pie dish, placing thereon a topping such as sauce, cheese, etc., and baking the whole. Historically, pizza was developed from a home dish, and is now often supplied by service shops.

The pizza crust is called the pie shell, and in a household and service shop, is prepared by a method comprising the steps of blending raw materials essentially consisting of wheat flour, kneading and maturing the dough, spreading the dough under pressure, and forming and baking the dough in a pie dish.

More particularly, pizza is produced by:

(1) A method in which an uncooked dough is prepared by hand as described in the foregoing, and the dough is cooked;

(2) A method in which the above-described uncooked dough is formed into a crust, and the crust is stored at a cool temperature or by freezing, to be later cooked; or (3) Recently, a circular, square, etc., bread-like, biscuit-like, or cracker-like pizza crust, which has been baked, or heat-treated so as to be easily cookable, is supplied and cooked. In addition, as described in Japanese Patent Application No. 63-318150, there is also known a bread-like pizza crust.

The pizza crust produced from uncooked dough has remarkable features in that the action of yeast blended with the raw material, enables a pizza pie to be prepared in which the crust and topping are well blended and integrated, having a soft and full state, and a good flavor and good taste. This conventional method however, has a defect in that each stage of the process requires much labor and time, although this depends upon the degree of skill of the cook, that a baking apparatus consuming a large amount of energy, such as gas oven, is required for the final baking, and that the pizza pie does not last long due to the use of an uncooked dough. The aforementioned crust prepared in such a way that an uncooked dough is formed into a crust, and the thus obtained crust is stored at a cool temperature or by freezing, can eliminate the defect that the untreated uncooked crust does not last long, but the other aforementioned defects remain, and further, a defect exists in that when stored at a cool temperature or by freezing, it is easily broken.

The circular or square shaped backed or heat-treated bread-like pizza crust has a merit in that it can be easily cooked with an apparatus not consuming a large amount of energy, such as oven toaster, etc., and that it will keep. Such a pizza crust, however, has a defect in that, as it is a pizza crust subjected to baking or heat-treatment, there is no yeast action during the cooking thereof, unlike a pizza crust prepared from uncooked dough, and it has a poor flavor and taste, and further, has an important defect in that the pizza crust and the topping to be placed thereon are separated from each other and do not blend well with each other. In addition, such a pizza crust also has a defect in that the topping overflows the crust, because the crust does not possess a flanged portion on the outer circumference thereof, that cooking for a long time is therefore impossible, and it is difficult to brown off the pizza pie. Further, it should be stored in a refrigerator so that it keeps well, because it is a bread-like or biscuit-like product. As described in Japanese Patent Application No. 63-318150, the baked or heat-treated bread-like pizza crust with a flange formed on the outer circumference overcomes the foregoing defect that the topping overflows at the time of cooking, but the other defects have not been overcome.

SUMMARY OF THE INVENTION

The present invention overcomes the above-mentioned various defects of the conventional pizza crusts, and the object of the present invention is to provide a pizza crust which enables an easy cooking of a pizza pie with a good flavor, good crispy feeling when eaten, and a good puffiness and good taste, without requiring a long time and much labor, and which may be cooked with an apparatus not consuming a large amount of energy such as oven toaster, and which keeps well and may be stored for a long time.

More specifically, the present invention provides a pizza crust comprising a top layer of an uncooked dough and a base layer of a dough obtained by subjecting a dough to baking or heat-treatment, the dough having a flanged portion formed on the outer circumference thereof.

The present invention further provides a pizza crust comprising a top layer of an uncooked dough and a base layer of uncooked dough, the dough having a flanged portion formed on the outer circumference thereof.

The present invention also provides a process for the production of a pizza crust, comprising the steps of:

fitting uncooked dough into a base template, placing a first cover template thereover, pressing the first cover template and removing the first cover template to thereby form a base layer; and supplying uncooked dough onto the formed base layer, placing a second cover template thereover, pressing the second cover template and then removing the second cover template to thereby prepare a top layer.

The present invention still further provides an apparatus for producing a pizza crust, comprising:

a base template defining a shape of a lower surface of a base layer of the pizza crust;

a first cover template defining a shape of an upper surface of the base layer of the pizza crust; and a second cover template defining the shape of the upper surface of the top layer of the pizza crust, wherein at least one of the first cover template and second cover template has a plurality of needle-like projections having a length corresponding to the thickness of the base layer or surface layer respectively, which needles make holes in the layer.

DESCRIPTION OF THE PREFERRED EMBODIMENTS

The present invention is further described in detail with reference to the drawings.

Figure 1:
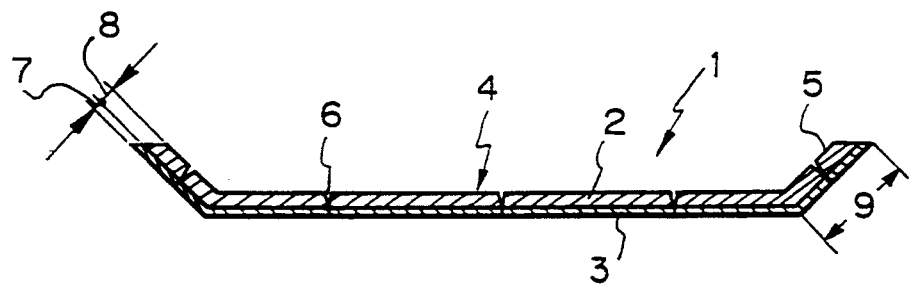
FIG. 1 represents a sectional view of a pizza crust of the present invention.

FIG. 1 shows a sectional view of the present pizza crust 1 comprising a top layer 2 and a base layer 3, both made of an edible dough. Both layers 2, 3 comprises a plane portion 4 and a flange portion 5, and both layers 2, 3 have a plurality of holes 6 made by needle-like projections provided on the working surface of a second cover template. The working surface of the second cover template means the surface which is in contact with the surface layer of the dough. The flange portion is projected at an angle of, for example, about 135° relative to the plane portion.

In this embodiment, it is assumed that the pizza crust is circular, and that the diameter thereof is 150 to 310 mm, the thickness 7 of the base layer is, for example, 1 to 3 mm or more, the thickness 8 of the surface layer is, for example, 3 to 6 mm or more, and the size of the flange portion 9 is, for example, 9 to 15 mm.

Figure 2:
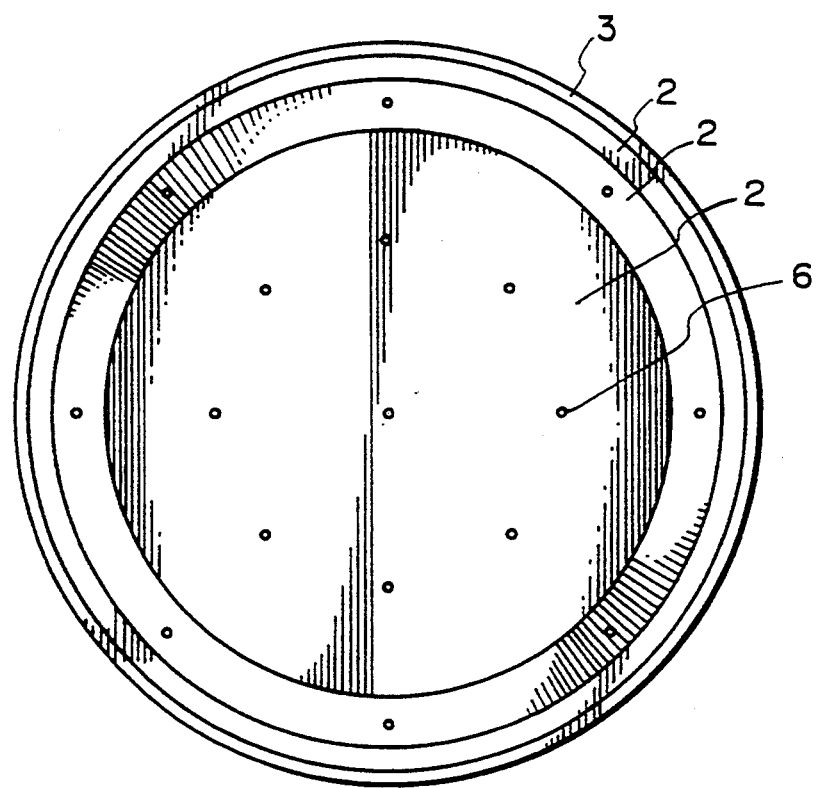
FIG. 2 represents a plan view of the pizza crust shown in FIG. 1.

FIG. 2 represents a plan view of the pizza crust shown in FIG. 1.

A pizza crust of the present invention is provided with a flange portion, whereby a topping such as cheese placed on the crust is prevented from overflowing during the cooking or baking thereof.

Although a circular formed pizza crust is exemplified, any shape such as ellipse, square or the like of a pizza crust can be obtained according to the present invention. Moreover, as the diameter of the pizza crust becomes larger, the thickness 7 of the base layer, the thickness 8 of the top layer, and the size 9 of the flange portion may become larger.

Figure 3:
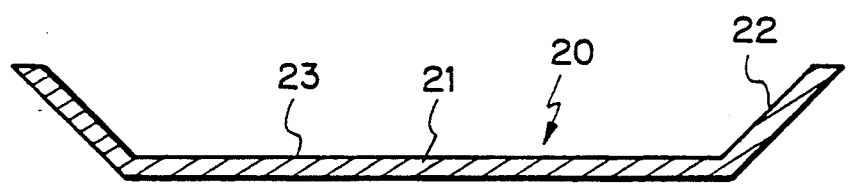
FIG. 3 represents a sectional view of a base template.
Figure 4:
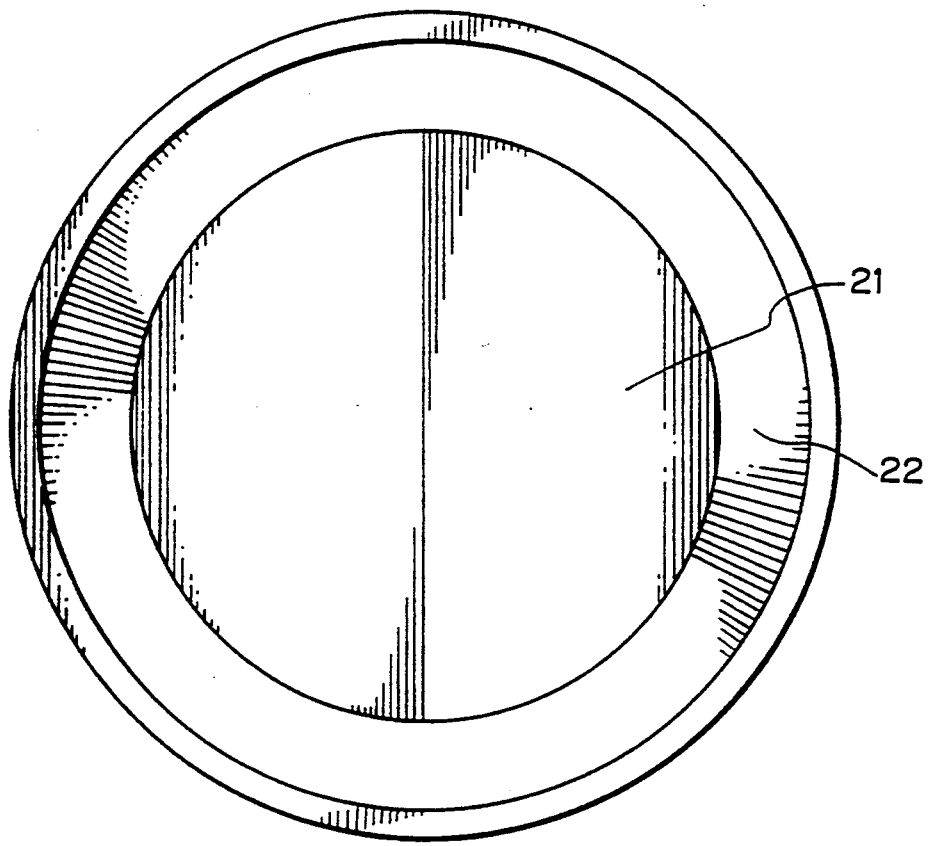
FIG. 4 represents a plan view of a base template.

FIG. 3 represents a sectional view of an embodiment of a base template of the present apparatus, and FIG. 4 represents a plan view of the base template shown in FIG. 3. The base template 20 defines the shape of a base layer of a pizza crust, and comprises a plane portion 21 and a flange portion 22. The upper surface 23 of the base template defines the shape of the lower surface of the base layer of dough, and the size and shape of the plane portions 21 and the flange portion 22 correspond to the size and shape of the base layer.

Figure 5:
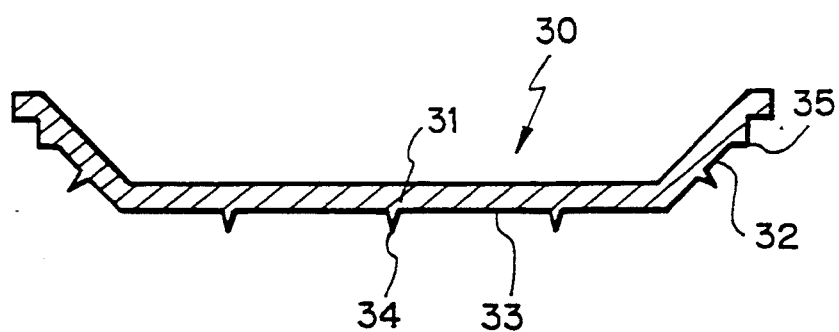
FIG. 5 represents a sectional view of a first cover template.
Figure 6:
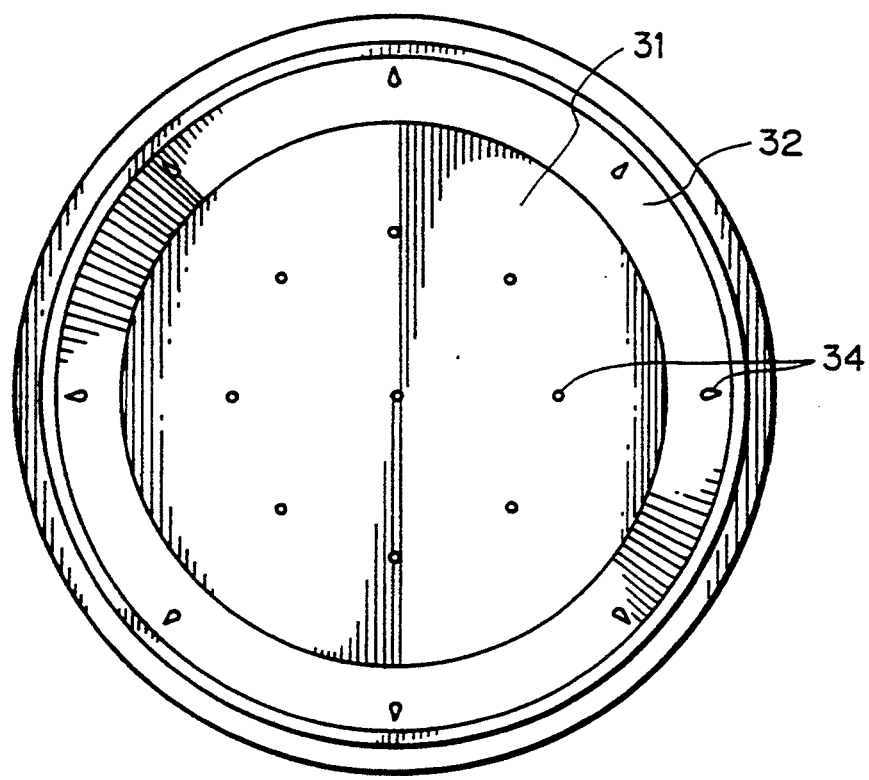
FIG. 6 represents a plan view of the working surface (which is in contact with the base layer) of the first cover template.

FIG. 5 represents a sectional view of an embodiment of a first cover template, and FIG. 6 represents a plan view of the first cover template shown in FIG. 5. The first cover template 30 comprises a plane portion 31 and a flange portion 32. The working surface 33, which is in contact with the upper surface of the base layer of the dough, and therefore, defines the shape of the upper surface of the base layer, has a plurality of needle-like projection 34. In the use of the apparatus, the tips of the projections 34 are brought into contact with the upper surface 23 of the base template 20 and define a spare between the upper surface 23 of the base template and the working surface (lower surface) 33 of the first cover template, the base layer being sandwiched therebetween. Therefore, the height of the projection 34 defines the thickness of the base layer.

Figure 7:
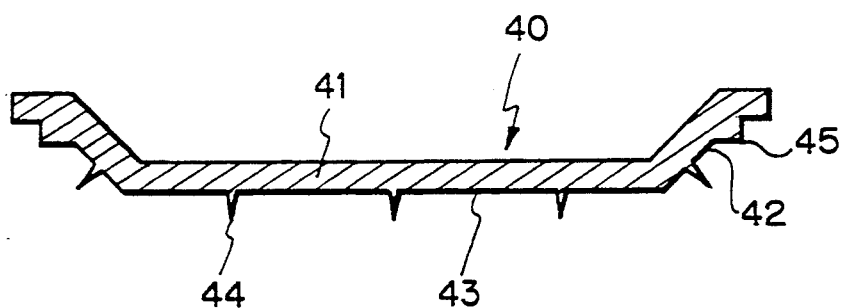
FIG. 7 represents a sectional view of a second cover template.
Figure 8:
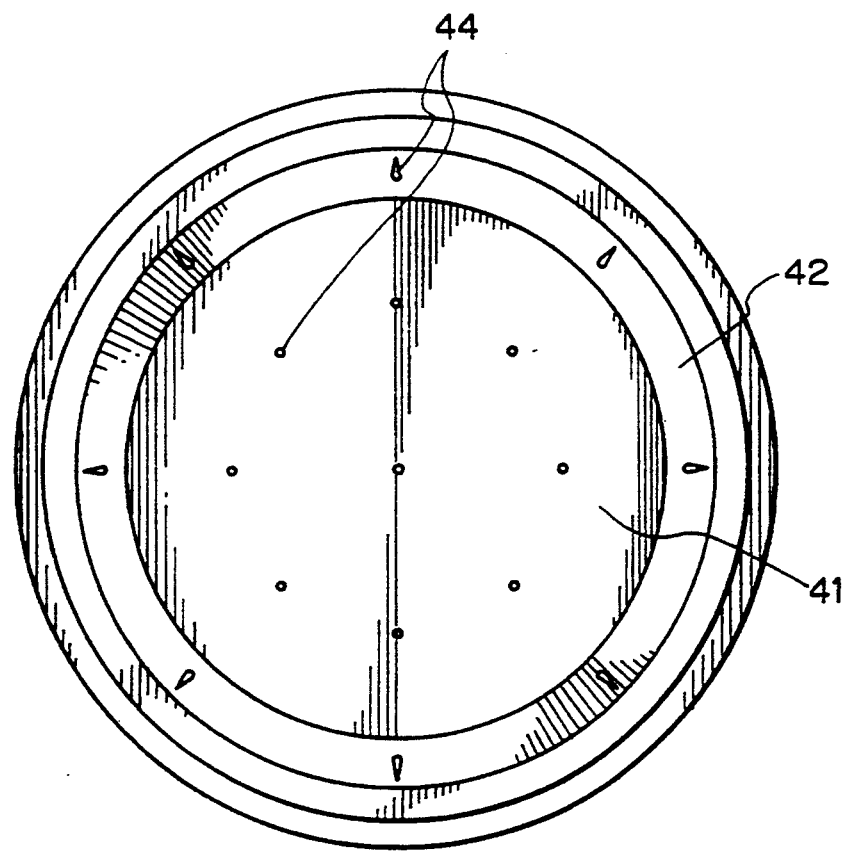
FIG. 8 represents a plan view of the working surface (which is in contact with the top layer) of the second cover template.

FIG. 7 represents a sectional view of an embodiment of a second cover template 40. The second cover template 40 comprises a plane portion 41 and a flange portion 42, and a working surface 43, which is in contact with the upper surface of the top layer of the dough, and therefore, defines the same of the upper surface of the tap layer, having a plurality of needle-like projections 44. In the use of the apparatus, the tips of the projections 44 are brought into contact with the upper surface 23 of the base template 20 and define a space between the upper surface 23 of the base template 20 and the working surface (lower surface) 43 of the second cover template 40, both the base layer and the top layer being sandwiched therebetween. Therefore, the height of the projection 44 defines the total thickness of the base layer and the top layer.

Note, the projections 44 of the second cover template are always higher than the projections 34 of the first cover template.

Although first and second cover templates are described above, according to the present invention more than two cover templates can be used. For example, a third cover template can be used wherein the needle-shaped projections of the third cover template are longer than the projections 44 of the second cover template. The use of such an apparatus provides a three-layer pizza crust.

The number of projections of the first and second cover templates is not critical and can be from 10 to 30, preferably 15 to 20, for example 18.

Alternatively, the edge 35 formed on the lower surface of the flange portion 32 of the first cover template 30, or the edge 45 formed on the lower surface of the flange portion 42 of the second cover template 40 is brought into contact with the upper surface flange portion 22 of the base template, whereby a space is defined between the base template and the first or second template. In this case, the height of the projections 34 of the first cover template or of the projections 44 of the second cover template need not be the same as the thickness of the base layer, or the total thickness of the base and top layers.

The base template, first template and second template, as well as other templates if any, may be made of a heat resistant material such as metal, for example, iron or stainless steal.

Figure 9:
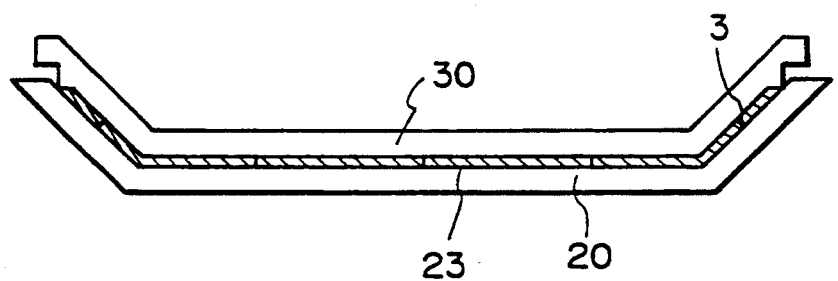
FIG. 9 represents a sectional view wherein a base layer is pressed between a base template and a first cover template.
Figure 10:
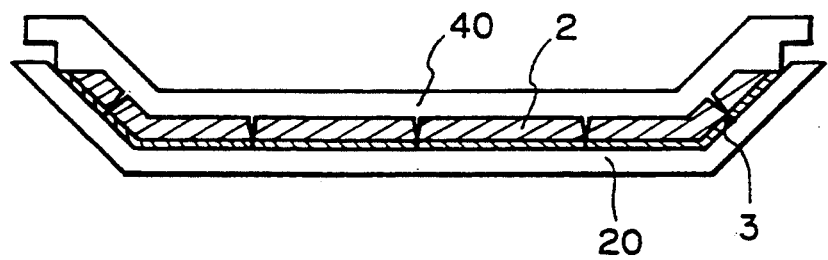
FIG. 10 represents a sectional view wherein a base layer and a top layer are pressed between a base template and a second cover template.

When the production of a pizza crust according to the present invention is carried out, as shown in FIGS. 9 and 10, a pizza dough is placed on the upper surface 23 of the base template 20, and the first cover template is placed thereover and pressed down, whereby the base layer 3 is formed between the base template 20 and the first cover template 30. Next, the first cover template is removed, a dough for the top layer is placed on the base layer 3, and the second cover template is placed thereover and pressed down, to thereby form the top layer between the base layer and the second cover template.

According to one embodiment of the present invention, neither the base layer nor top layer are baked, and in this case, preferably before removing the second cover template, the base layer and top layer are frozen, and the frozen pizza crusts are packaged and shipped. Alternatively, the frozen pizza crusts are lyophilized, and the dried product is shipped.

According to another embodiment of the present invention, the base layer dough is baked prior to placing the top layer dough thereon. The baking is preferably carried out until the color of the surface of the base layer becomes a light brown. In any case, the top layer is not baked, and prior to removing the second cover template, is frozen. The frozen product is then packaged and shipped, or further, is lyophilized and the dried product is packaged and shipped.

Prior to eating, an appropriate amount of water is added to the pizza crust, and after putting the topping such as cheese, cut vegetables or the like, on the pizza crust, it is heated or cooked.

To obtain the baking dough to be used in the pizza crust of the present invention, strong flour, soft flour, cow milk, egg, sugar, salt, olive oil, and water are mixed in a predetermined ratio, the mixture is aged, and the dough is spread under pressure.

To obtain an uncooked dough for the top layer strong flour, soft flour, cow milk, egg, sugar, salt, olive oil, and water are mixed in a predetermined ratio, the mixture is aged, and the thus-obtained dough is used. The pizza crust of the present invention is produced while the top layer thereof is still an uncooked dough. In the case of a dried pizza crust, if the uncooked dough freeze-dried, pizza crusts can be distributed in the market in a dried state without losing their characteristics and properties. That is, the dried pizza crust is rapidly restored to its original uncooked state and can exhibit the properties possessed by the uncooked dough, by heating the crust when it is to be used.

The pizza crust of the present invention can be easily cooked by equipment with a small calorific power such as oven toaster or the like, and as the yeast functions at the time of cooking, there is obtained a soft full and sticky pizza pie, in which the topping and crust are well blended.

The pizza crust of the present invention is characterized in that it can be produced in an optional shape by forming the shape of the concave portion provided on the template for baking not only in a circular shape but also in an elliptic, square or the like, as described above, and forming a cover plate according to the shape of the concave portion, and as mentioned above, it can be produced by constituting the dough for base layer and the dough for surface layer in a flat surface state in two layers, and by cutting the thus obtained two-layer dough.

The pizza crust of the present invention is produced as mentioned above, and because the pizza crust is formed in two or more layers, and is a refrigerated product, and as it may be a baked refrigerated product, its appearance is not lost, and the dried pizza crust has a merit in that it may be transported and stored at a normal temperature, because the dough for the surface layer thereof is a freeze-dried dough.

In addition, because the pizza pie is formed in two or more layers and a flange portion is formed, there is obtained the effect such that a product is supplied which is soft and full and has a good flavor and taste, the crust is well blended with the topping, and is crispy and has good feeling when eaten, the topping does not overflow, scorched lines can be impressed thereon, and it can be easily cooked without much labor and using equipment with a small calorific power such as oven toaster, and it keeps well.

In addition, according to the device and method for the production of a pizza crust according to the present invention, each of the processing means can be disposed along the manufacturing line, so that a large scale production becomes possible, and viewed from the point of construction, it is possible to keep the thickness of the crust constant, and therefore, it is possible to obtain pizza crusts with a constant quality kept.

The pizza crust of the present invention may comprise a top layer of an uncooked dough and a base layer of an uncooked dough or a dough obtained by baking or heat treatment, said layers having an inclined flange portion formed on the outer circumference thereof. Such a multi-layer pizza crust, may further comprise a batter, wafer, oblate and the like between the dough on the top layer and that of the base layer of the pizza crust. The pizza crust of the present invention may be used by laminating the said layers or inserting another edible material therebetween. Alternatively, the pizza crust may be used by placing on the base layer thereof granules prepared by freezing, or freeze-drying, and milling an uncooked dough.

I claim:

1. A pizza crust comprising a top layer of an uncooked dough and a base layer of a dough obtained by subjecting a dough to baking or heat-treatment, said layers having an inclined flange portion formed on the outer circumference thereof, wherein granules prepared by freezing or freeze-drying, and milling an uncooked dough are placed on the base layer.

2. A pizza crust comprising a top layer of an uncooked dough and a base layer of a uncooked dough, said layers having an inclined flange portion formed on the outer circumference thereof, wherein granules prepared by freezing or freeze-drying, and milling an uncooked dough are placed on the base layer.

3. A multi-layer pizza crust, according to claim 1, further comprising a batter, wafer or starch sheet between the dough of the top layer and that of the base layer of the pizza crust.

4. A pizza crust according to claim 1, wherein the pizza crust is used by laminating said layers or inserting another edible material therebetween.

5. A multi-layer pizza crust, according to claim 2, further comprising a batter, wafer or starch sheet between the dough of the top layer and that of the base layer of the crust.

6. A pizza crust according to claim 2, wherein the pizza crust is used by laminating said layers or inserting another edible material therebetween.

7. An apparatus for producing a pizza crust comprising:
a base template defining a shape of a lower surface of a base layer of the pizza crust;
a first cover template defining a shape of an upper surface of a base layer of the pizza crust; and
a second cover template defining a shape of an upper surface of a top layer of the pizza crust, wherein at least one of the first cover template and second cover template is provided with a plurality of needle-like projections for making holes in said layer.

* * * * *